(12) United States Patent
Franke et al.

(10) Patent No.: US 11,864,963 B2
(45) Date of Patent: Jan. 9, 2024

(54) COLOUR MATCHING FOR DENTAL RESTORATIONS

(71) Applicant: DENTSPLY SIRONA INC., York, PA (US)

(72) Inventors: Frederike Franke, Darmstadt (DE); Christoph Brandes, Mannheim (DE); Michael Bäurer, Bretten (DE); Björn Voss, Heidelberg (DE)

(73) Assignee: DENTSPLY SIRONA INC., York, PA (US)

( * ) Notice: Subject to any disclaimer, the term of this patent is extended or adjusted under 35 U.S.C. 154(b) by 426 days.

(21) Appl. No.: 17/298,195

(22) PCT Filed: Nov. 25, 2019

(86) PCT No.: PCT/US2019/062906
§ 371 (c)(1),
(2) Date: May 28, 2021

(87) PCT Pub. No.: WO2020/112584
PCT Pub. Date: Jun. 4, 2020

(65) Prior Publication Data
US 2022/0096214 A1   Mar. 31, 2022

(30) Foreign Application Priority Data
Nov. 29, 2018   (EP) .................................. 18209279

(51) Int. Cl.
*A61C 13/08*   (2006.01)
*A61C 13/00*   (2006.01)
(Continued)

(52) U.S. Cl.
CPC ........ *A61C 13/082* (2013.01); *A61C 13/0004* (2013.01); *A61C 13/083* (2013.01); *B28B 11/12* (2013.01); *B28B 11/243* (2013.01)

(58) Field of Classification Search
CPC . A61C 13/082; A61C 13/0004; A61C 13/083; B28B 11/12; B28B 11/243
See application file for complete search history.

(56) References Cited

U.S. PATENT DOCUMENTS 6,384,917 B1 * 5/2002 Fradkin ................. G01J 3/51
356/402
7,957,573 B2   6/2011 Ikeda
(Continued)

FOREIGN PATENT DOCUMENTS

CN        106336214 A     1/2017
DE    102016202902 A1     8/2017
(Continued)

OTHER PUBLICATIONS

International Search Report; PCT/US2019/62906; Jan. 25, 2020 (completed); dated Feb. 7, 2020.
(Continued)

*Primary Examiner* — Joseph S Del Sole
*Assistant Examiner* — Jamel M Nelson
(74) *Attorney, Agent, or Firm* — DENTSPLY SIRONA INC.

(57) ABSTRACT

The invention relates to a method and to a corresponding system for providing a dental prosthesis made from ceramic material having a colour matched to the patient comprising the following steps: (i) receiving a desired nominal colour for the dental prosthesis, determining a deviation between the nominal colour and actual colour of the sintered ceramic material by the control unit and defining a temperature time cycle having a cycle time suitable for compensation of the deviation, for sintering at a defined sintering temperature and creating a corresponding sintering program by the control unit; and (ii) adjusting the actual colour of the selected ceramic material to the nominal colour in the
(Continued)

sintering furnace by the sintering program executed by the sintering furnace.

15 Claims, 3 Drawing Sheets

(51) Int. Cl.
  *A61C 13/083* (2006.01)
  *B28B 11/12* (2006.01)
  *B28B 11/24* (2006.01)

(56) References Cited

U.S. PATENT DOCUMENTS

| | | |
|---|---|---|
| 9,008,417 B2 | 4/2015 | Rohner |
| 2009/0026643 A1 | 1/2009 | Wiest |
| 2012/0110851 A1 | 5/2012 | Jung |
| 2015/0173869 A1 | 6/2015 | Jung |
| 2016/0302896 A1* | 10/2016 | Miller .................. A61C 13/083 |

FOREIGN PATENT DOCUMENTS

| | | | |
|---|---|---|---|
| WO | 2013090860 A1 | 6/2013 | |
| WO | WO-2013090860 A1 * | 6/2013 | ........... A61C 13/082 |

OTHER PUBLICATIONS

International Preliminary Report on Patentability; PCT/US2019/62906; Jan. 25, 2020 (completed); dated Feb. 7, 2020.
Written Opinion of the International Searching Authority; PCT/US2019/62906; Jan. 25, 2020 (completed); dated Feb. 7, 2020.
European Office Action dated Feb. 8, 2022.

* cited by examiner

COLOUR MATCHING FOR DENTAL RESTORATIONS

CROSS-REFERENCE TO RELATED APPLICATIONS

This is a National Phase application of International Application No. PCT/U320191062906, filed Nov. 25, 2019, which claims the benefit of and priority to EP Application Ser. No. 18209279.1, filed on Nov. 29, 2018, which are herein incorporated by reference for all purposes.

FIELD OF THE INVENTION

The invention relates to a method for providing a dental prosthesis for patients which is made from a ceramic material having a colour matched to the patient situation, and to a system with which the method can be performed.

BACKGROUND OF THE INVENTION

Teeth may have to be partially or completely replaced by a corresponding dental prosthesis in dental treatments. The tooth colour of the teeth to be replaced may, however, vary considerably from patient to patient or from tooth to tooth in the same patient. Tooth colour is a combination of light absorption, transmission, reflection and remission on the teeth. It is essential for the dental prosthesis to have the correct colour to provide a satisfactory visual appearance for the patient. These days, ceramic materials allow the dental prosthesis to be visually very well matched to the teeth to be replaced in dental restorations. At present, not only monochromatic, for example monochromatic zirconium oxide with different colours, but also polychromatic blocks of ceramic material are offered for sale. Tooth colours, however, are often located between the colours in which these blocks are offered. If the tooth colour required for the individual restorative care is located between two standard colour shades of the ceramic material, subsequent time-consuming customisation of the dental prosthesis is therefore necessary to match the restoration to the adjoining teeth in terms of appearance. Hitherto, either a different coloured block has been used which approximates as closely as possible to the tooth colour of the patient or the colour of the block has been matched in the desired direction by staining or glazing.

DE 10 2010 017 407 A1 discloses a method for matching the tooth colour of the dental prosthesis in a sintering process in which, in addition to the actual sintering process of the ceramic dental prosthesis material, a multiple shading stain is applied, dried and sintered together with the ceramic material. In a further process step, a glazing overlay is additionally applied, dried and the resultant dental prosthesis material sintered again so that a glaze with multiple shading colours is formed on the solid ceramic restoration, whereby natural colouring of the solid ceramic restoration is achieved. The additional application steps for multiple shading agent and glazing overlay, the respective subsequent drying steps and the consequently required multipart sintering process do, however, mean that the sintering operation is complicated, costly and time-consuming.

It would be desirable to have a less complicated, costly and time-consuming process for providing a dental prosthesis with which a dental prosthesis having a colour precisely matched to the colour of the patient's natural teeth can nevertheless be provided.

SUMMARY OF THE INVENTION

It is therefore an object of the invention to provide a less complicated, less costly and less time-consuming method for providing a dental prosthesis with which a dental prosthesis having a colour precisely matched to the colour of the patient's natural teeth can nevertheless be supplied.

Said object is achieved by a method for providing a dental prosthesis for a patient which is made from a ceramic material having a colour matched to the colour of the patient's natural teeth, wherein a sintering furnace for sintering the ceramic material and a control unit for controlling the sintering furnace are used for carrying out the following steps:

receiving a desired nominal colour for the dental prosthesis by the control unit;

determining a deviation between the nominal colour and actual colour of the sintered ceramic material by the control unit;

defining a temperature-time cycle, suitable for compensation of the deviation, for sintering at a defined sintering temperature and creating a corresponding sintering program having a cycle time individually defined for the ceramic material to be sintered by the control unit; and adjusting the actual colour of the ceramic material to the nominal colour in the sintering furnace by the sintering program created by the control unit and executed by the sintering furnace.

The above steps may here proceed automatically in the claimed method. In the sintering process, only the cycle time at the sintering temperature is varied in order to adjust the actual colour to the nominal colour. For the different materials, values are stored in a database as to how the sintering program affects the color. Based on the desired color matching, the sintering program is then used or derived from this database. Thanks to the defined sintering temperature, the mechanical properties of the sintered ceramic material, which determine the sintering temperature, remain substantially unchanged, despite its being possible to greatly vary the nominal colours by means of the cycle time. As a consequence, it is possible to decouple the two parameters (a) mechanical properties and (b) visual properties from one another, so permitting greater variation in the resultant properties of the dental prosthesis. The defined sintering temperature is a sintering temperature within a defined temperature range. Here the sintering temperature may vary or might be constant within this defined temperatue range.

The nominal colour is the colour which the sintered ceramic is intended to have so that its appearance corresponds to the appearance of the patient situation. The actual colour is the colour of the sintered ceramic after a standard process without adapting the cycle time to the nominal colour. The term "colour" here denotes the overall visual colour appearance of the dental prosthesis or natural teeth, including any colour gradation in the dental prosthesis or natural teeth, and is made up of visual properties such as lightness, translucency (opacity) and colour of the ceramic material or natural teeth to which the dental prosthesis is to be added.

The ceramic material used is generally zirconium oxide or doped zirconium oxide. Zirconium oxide has high bending strength, excellent biocompatibility and enables dental substance-preserving preparation of the dental prosthesis. Further ceramic materials which are used for producing dental restorations are for example vitreous ceramics (glass which is subjected to a crystallisation process), glass-infiltrated oxide ceramics (for example aluminium oxide as partially sintered $Al_2O_3$ powder which is infiltrated with a glass), polycrystalline oxide ceramics, spinels or yttrium aluminium garnet. The ceramic material is typically provided in blocks from which the actual dental prosthesis is then shaped by means of suitable machining steps, for example in a grinding and milling unit. The shape of the dental prosthesis to be produced in this manner is obtained from a proposed restoration calculated on the basis of previously determined contour data of the patient's existing teeth, the contour data of which control the corresponding grinding and milling process. The dental prosthesis shaped in this manner is then sintered in the above adjustment step in order to produce the mechanical and visual properties.

The control unit may be arranged as a separate component or as a constituent part of the further components. The control unit for example comprises at least one processor, at least one memory unit and one or more programs installed and executed on the control unit for determining a deviation between nominal colour and actual colour and for creating a sintering program based on material and process data.

The term "sintering furnace" denotes any devices which are suitable for performing a sintering process, wherein the sintering furnace is controllable by the control unit in order to be able to adapt the sintering program (temperature profile as a function of time during the sintering process) individually to the respective ceramic material and the desired nominal colour and execute it. The sintering furnace may here in addition be designed to perform the sintering process in a respectively desired atmosphere and at a respectively desired pressure. The size of the sintering furnace may be matched to the size of the ceramic restoration to be sintered. For example, small sintering furnaces can establish the mechanical properties of dental crowns in a sintering time of 10-15 minutes. The process time (sintering time) additionally includes the cycle time at the defined sintering temperature, which is e.g. held constant, to be applied for the nominal colour to be established on the basis of the existing actual colour, which time may for example be between 2 minutes and 20 minutes. The defined sintering temperatures may vary as a function of the material to be sintered. For zirconium oxide, the defined sintering temperature might be held constant for example at 1580° C.

The method according to the invention therefore provides a less complicated, less costly and less time-consuming method for a dental prosthesis with which a dental prosthesis having a colour precisely matched to the colour of the patient's natural teeth can nevertheless be supplied.

In one embodiment, it is ensured when defining the cycle time that the defined cycle time for adjusting the actual colour to the nominal colour exceeds a minimum cycle time for achieving desired mechanical properties of the ceramic material. Sintering during the minimum cycle time establishes the mechanical properties of the sintered ceramic material, the further subsequent cycle time having no further substantial influence thereon. The minimum cycle time thus denotes the time at defined sintering temperature after which the mechanical properties of the sintered ceramic material have been substantially established. The minimum cycle time may, however, differ between differently sized restorations. Smaller crowns here require a shorter minimum cycle time than, for example, larger, more voluminous bridges. The minimum cycle times for establishing the mechanical properties are between 1 minute and 15 minutes for zirconium oxide ceramics.

In a further embodiment, when defining the cycle time, a cycle time is defined which is longer in comparison with the minimum cycle time, the lower the lightness of the sintered ceramic material and/or the greater the change in opacity of the sintered ceramic material which is to be established, wherein, the longer the cycle time, the further away the colour is from the actual colour of the ceramic material. The distance of the nominal colour from the actual colour is denoted as colour shift. The lightness value (also denoted L value) is here established as the guiding parameter for adjusting the actual colour to the nominal colour. The L value is a parameter of the Lab colour space which device-independently describes all perceptible colours in terms of lightness, red-green content and yellow-blue content. Typically, the color values are given in $L^*a^*b^*$ values with $L^*$ for the lightness and $a^*$ and $b^*$ for the green—red and blue—yellow color components. Between the $L^*a^*b^*$ values of the nominal and actual color, a distance (Delta E) can then be calculated. The nominal values are determined during the designing process of the dental restorations, the actual colors for the materials are stored in a database. In addition to $L^*a^*b^*$ values, the reflection spectrum of actual and nominal color can also be used to determine the color difference. Lightness is here related to illuminant. In Europe, lightness values are conventionally stated for a standard illuminant D65, which corresponds to light with a colour temperature of 6500 K. The other parameters, such as the translucency parameter for establishing opacity and the colour shift of the colour away from the original colour (actual value) are obtained from the cycle time desired for the lightness value. The lightness of a ceramic material can be changed, for example by 5% or more, by suitably selected cycle times. In the event of a colour shift, a perceptible change in colour is conventionally denoted a change by one step. Colour can be varied by more than four steps using the method according to the invention. The lightness value, colour and opacity (translucency) can thus be varied over a broader range, which makes it possible to provide the finished sintered dental prosthesis with a virtually identical visual appearance in comparison with the patient's natural teeth without additional further colour-imparting process steps and/or additional materials or additional coatings. In a further embodiment, the cycle time is defined between 100 s and 1200 s, preferably between 100 s and 600 s. For these cycle times, the greatest changes in lightness value, opacity (translucency parameter) and colour shift for establishing a desired colour of the dental prosthesis can be achieved by suitable selection of the sintering process.

In a further embodiment, the method comprises the additional step of selection by the control unit of a ceramic material, the actual colour of which approximates as closely as possible to the nominal colour, as the ceramic material to be sintered and output of the selected ceramic material by means of an output unit. Output may here be taken to mean not only the issue of an item of information or name of the selected ceramic material but also the physical output of the ceramic material as a block of material for further processing. The latter further increases the degree of automation and avoids a source of error arising from manually taking the incorrect material from a material store. The selected ceramic material is then shaped into the dental prosthesis in a suitable machining unit and subsequently sintered.

In a further embodiment, the control unit accesses material data and/or process data stored in a database for selecting the ceramic material. The ceramic material is typically provided in blocks which are offered for sale for example in up to 16 different VITA colours. The different colours are produced by doping the ceramic material. The nominal and actual colours for the subsequent sintering process are defined by selecting the corresponding ceramic material blocks. The different materials and the colour shades thereof are stored in the database for selecting the suitable ceramic material. Other materials with other properties may here be added at any time such that the selection thereof may likewise be controlled.

In a further embodiment, the method comprises the additional steps of:

determining the nominal colour by means of a colour recognition device which is suitable for recognising a tooth colour of the patient's existing natural or other teeth; and transmitting the determined nominal colour to the control unit. The nominal colour may be determined by scanning the patient's teeth, for example by taking a 3D image of the teeth in natural colour with a 3D colour camera and determining the colour of the teeth with appropriate image analysis software.

In a further embodiment, the method comprises the additional step of reading in or inputting user-defined wishes regarding the dental prosthesis, preferably regarding nominal colour, via a user interface with the control unit, wherein the control unit is designed to take account of the user-defined wishes during creation of the sintering program. Wishes may be specific material properties such as visual properties, for example lightness of the material, opacity and degree of colour shift. The wishes may, however, also relate to carrying out specific sintering programs which are executed instead of the sintering program created on the basis of the nominal/actual comparison. The user interface may for example take the form of a menu controlled input screen for inputting the wishes or of an interface for receiving data corresponding to the wishes or of a read-in device (for example a scanner or near-field reader) for reading in the wishes. The method may here take the form of a self-learning method in which, on the basis of the user wishes read in or input over time, the control unit autonomously modifies the creation of the sintering programs in such a manner that, in addition to the deviation between nominal colour and actual colour, the history of user wishes and optionally additionally further patient data such as age, smoker or non-smoker, skin colour etc. are also included in the definition of the suitable cycle time, such that personal preferences may also be included in the automatically created sintering programs.

In a further embodiment, the method comprises the additional step of saving created sintering programs in a memory unit which the control unit can access in particular for subsequently executing the sintering programs. In one further embodiment, this access may proceed only once access authorisation has been checked. The production process can be simplified by the possible use of pre-stored sintering programs. A repeat or additional dental prosthesis can optionally be performed for a particular patient by using the stored sintering program without its being necessary to create a new sintering program.

In a further embodiment, in addition to the respective sintering temperatures for the respective ceramic materials, the respective heating and cooling rates for the created sintering programs are held constant. Different ceramic materials may naturally be sintered with different sintering temperatures and heating and cooling rates. For one and the same material, however, only the cycle time is varied for establishing the nominal colour. Mechanical properties thus remain unchanged, despite its being possible to greatly vary the nominal colours.

The invention further relates to a system for providing a dental prosthesis for a patient which is made from a ceramic material having a colour matched to a patient situation by means of a sintering furnace for sintering the ceramic material and a control unit which is connected to the sintering furnace via a data line for controlling the sintering furnace and is designed to receive a desired nominal colour for the dental prosthesis, determine a deviation between the nominal colour and the actual colour, define a temperature-time cycle having a cycle time, suitable for compensating the deviation, for sintering at a defined sintering temperature and create a corresponding sintering program having a cycle time individually defined for the ceramic material to be sintered, wherein the sintering furnace is provided to execute a corresponding sintering program defined by the control unit which comprises the defined cycle time at the defined sintering temperature and so adjust the actual colour of the selected ceramic material to the nominal colour. The control unit for example comprises to this end at least one processor, at least one memory unit and one or more programs installed and executed on the control unit for determining a deviation between nominal colour and actual colour and for creating a sintering program based on material and process data. For the purposes of the present invention, the control unit may also comprise a combination of a plurality of sub-control units which are interconnected via data lines for exchanging data for performing the above developments. The control unit may here be arranged as one or more separate components or as a constituent part in one of the further system components such as for example sintering furnace, colour recognition device or machining unit.

The system according to the invention thus makes it possible in a less complicated, less costly and less time-consuming manner to provide a dental prosthesis having a colour precisely matched to the colour of the patient's natural teeth.

In one embodiment, the system further comprises a colour recognition device for determining the nominal colour which is suitable for recognising a tooth colour of the patient's existing natural or other teeth, wherein the colour recognition device is connected by a data line to the control unit for transmitting the determined nominal colour. The data line may here be embodied in wired or wireless form.

In a further embodiment, the system comprises a database containing material data and/or process data which the control unit can access for determining the deviation between nominal colour and actual colour. In one further embodiment, the system additionally comprises an output unit with which the ceramic material selected by the control unit can be output. In one further embodiment the system additionally comprises a user interface with the control unit, via which user-defined wishes regarding the dental prosthesis can be input, wherein the control unit is designed to take account of the user-defined wishes during creation of the sintering program. In one further embodiment, the system additionally comprises a memory unit for saving created sintering programs which the control unit can access in particular for subsequently executing the sintering programs, preferably after checking access authorisation. In one further embodiment, the system additionally comprises a machining unit for shaping the dental prosthesis made from the ceramic material before sintering is performed. The system may here take the form of a self-learning system in which, on the basis of the user wishes read in or input over time, the control unit autonomously modifies the creation of the sintering programs in such a manner that, in addition to the deviation between nominal colour and actual colour, the history of user wishes and optionally additionally further patient data such as age, smoker or non-smoker, skin colour etc. are also included in the definition of the suitable cycle time, such that personal preferences may also be included in the automatically created sintering programs.

The above-listed embodiments can be used individually or in any desired combination with one another for developing the device according to the invention and the method according to the invention.

BRIEF DESCRIPTION OF THE FIGURES

These and other aspects of the invention are disclosed in detail in the figures as follows.

DETAILED DESCRIPTION OF EXEMPLARY EMBODIMENTS

Figure 1:
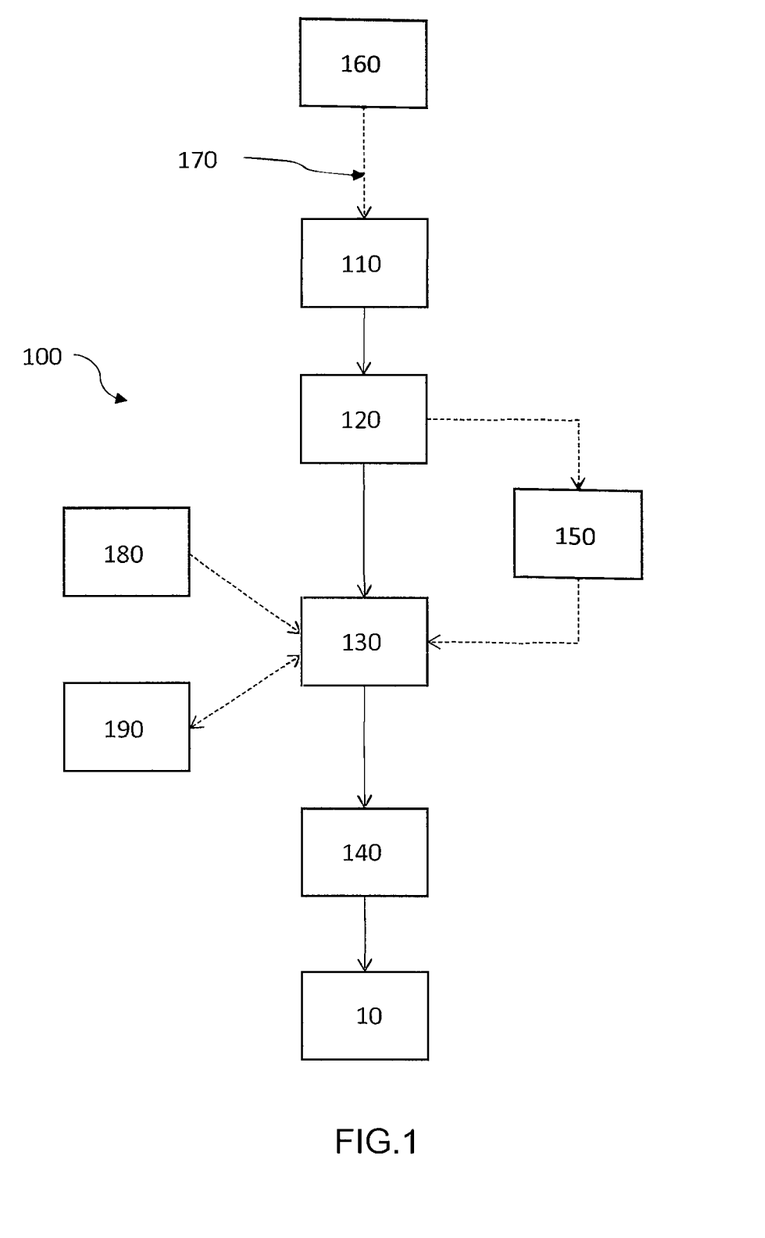
FIG. 1 is a schematic diagram of one embodiment of the method according to the invention.

FIG. 1 is a schematic diagram of an embodiment of the method according to the invention 100 for providing a dental prosthesis 10 for a patient which is made from a ceramic material 2 having a colour matched to a patient situation, wherein use is made of a sintering furnace for sintering the ceramic material and of a control unit for controlling the sintering furnace for carrying out the steps of receiving 110 a desired nominal colour for the dental prosthesis 10 by the control unit 4; determining 120 a deviation between the nominal colour and actual colour of the sintered ceramic material 2 by the control unit 4; defining 130 a temperature-time cycle having a cycle time TH, suitable for offsetting compensation of the deviation, for sintering at a defined sintering temperature TS and creating a corresponding sintering program 5 having a cycle time TH individually defined for the ceramic material 2 to be sintered by the control unit 4; and adjusting 140 the actual colour of the ceramic material 2 to the nominal colour 4 in the sintering furnace 3 by the sintering program 5 created by the control unit 4 and executed by the sintering furnace 3. In addition to the respective sintering temperatures for the respective ceramic materials 2, the respective heating and cooling rates for the created sintering programs 5 are here held constant. After sintering, the dental prosthesis 10 is produced as desired. In step 130, it is ensured that the defined cycle time TH for adjusting 140 the actual colour to the nominal colour here exceeds a minimum cycle time TM for achieving desired mechanical properties of the ceramic material 2. The method may here comprise the additional step of selection 150 by the control unit 4 of a ceramic material, the actual colour of which approximates as closely as possible to the nominal colour, as the ceramic material 2 to be sintered and output of the selected ceramic material by means of an output unit 8. The control unit 4 can access material data and/or process data stored in a database 9 for selection 150 of the ceramic material 2. In addition, the method may comprise the steps of determining 160 the nominal colour by means of a colour recognition device 12 which is suitable for recognising a tooth colour of the patient's existing natural or other teeth; and transmitting 170 the determined nominal colour to the control unit 4. Transmission may here be made via wired or wireless data links. The method may further comprise the additional step 180 of reading in (for example by means of a scanner or near-field reader) or inputting (for example via an input screen) user-defined wishes regarding the dental prosthesis 10, preferably regarding the nominal colour, via a user interface 6 with the control unit 4, wherein the control unit 4 is designed to take account of the user-defined wishes during creation of the sintering program 5. The method may further comprise the additional step of saving 190 created sintering programs 5 in a memory unit 7 which the control unit 4 can access, in particular for subsequently executing the sintering programs 5, preferably after checking access authorisation.

Figure 2:
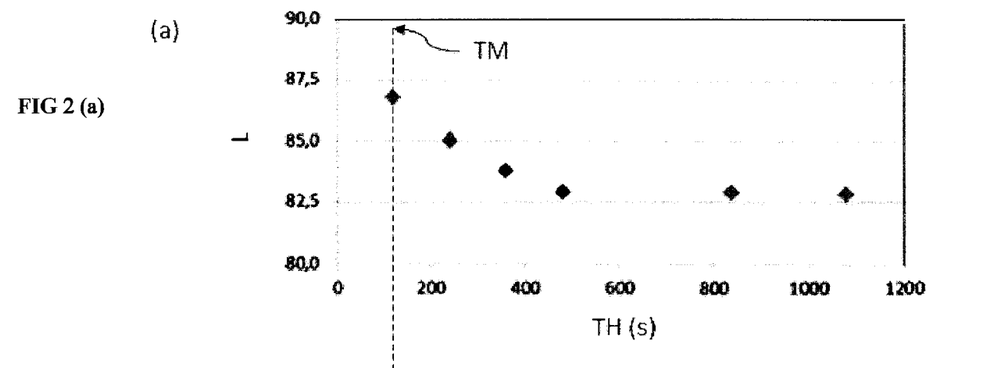
FIG. 2a shows the variation over time in (a) lightness as a function of cycle time on sintering at maximum sintering temperature.
FIG. 2b shows the variation over time in (b) translucency parameter as a function of cycle time on sintering at maximum sintering temperature.
FIG. 2c shows the variation over time in (c) colour shift as a function of cycle time on sintering at maximum sintering temperature.

FIG. 2 shows the variation over time in (a) lightness L, (b) translucency parameter TP, and (c) colour shift E (TH) of the colour normalised to the colour E at a cycle time of 120 s as a function of the cycle time TH on sintering at maximum sintering temperature TS for zirconium oxide. FIG. 2a shows that the L value, which indicates the lightness of a material, declines with cycle time TH. A lightness of 100 here corresponds to the colour white and a lightness of 0 to the colour black. This means that materials become somewhat darker as cycle time TH increases. FIG. 2b shows how the translucency parameter TP changes as a function of cycle time TH. This parameter is a measure of the opacity of the material. A low value means that the dental prosthesis (restoration) is more opaque and is better able for example to conceal a discoloured tooth stump. A high value would accordingly allow the natural stump colour to shine through in the case of a restoration (dental prosthesis). The change in translucency does not in itself constitute a colour shift. FIG. 2c shows the colour difference between ceramic materials with regard to the ceramic material which has been sintered with a cycle time TH of 120 s. As a rule of thumb, a rise by 0.8 to 1.0 amounts to a change in colour which is perceptible to an observer. The colour of the sintered material can be changed by roughly 4 steps by variation of the cycle time TH during sintering. A longer cycle time TH greater than the minimum cycle time TM is thus then defined by the control unit 4, the lower the lightness of the sintered ceramic material 2 and/or the greater the opacity of the sintered ceramic material 2 which is/are to be established, wherein the colour is further away from the actual value of the ceramic material 2 before sintering, the longer is the cycle time TH. From cycle times of 600 s or more, the lightness and the translucency of the ceramic material is largely established while the colour can still be slightly further changed. The greatest change in lightness and translucency takes place in the cycle time interval up to 500 s. The here constant sintering temperatures TS may vary as a function of the material to be sintered. For zirconium oxide the sintering temperature which is held constant is for example 1580° C. The minimum cycle time TM until the mechanical properties of the sintered ceramic material are established is here plotted as the lowest data value at a cycle time of 120 s to illustrate the relationship between minimum cycle time TM and cycle time TH for establishing the visual properties of the dental prosthesis 10.

Figure 3:
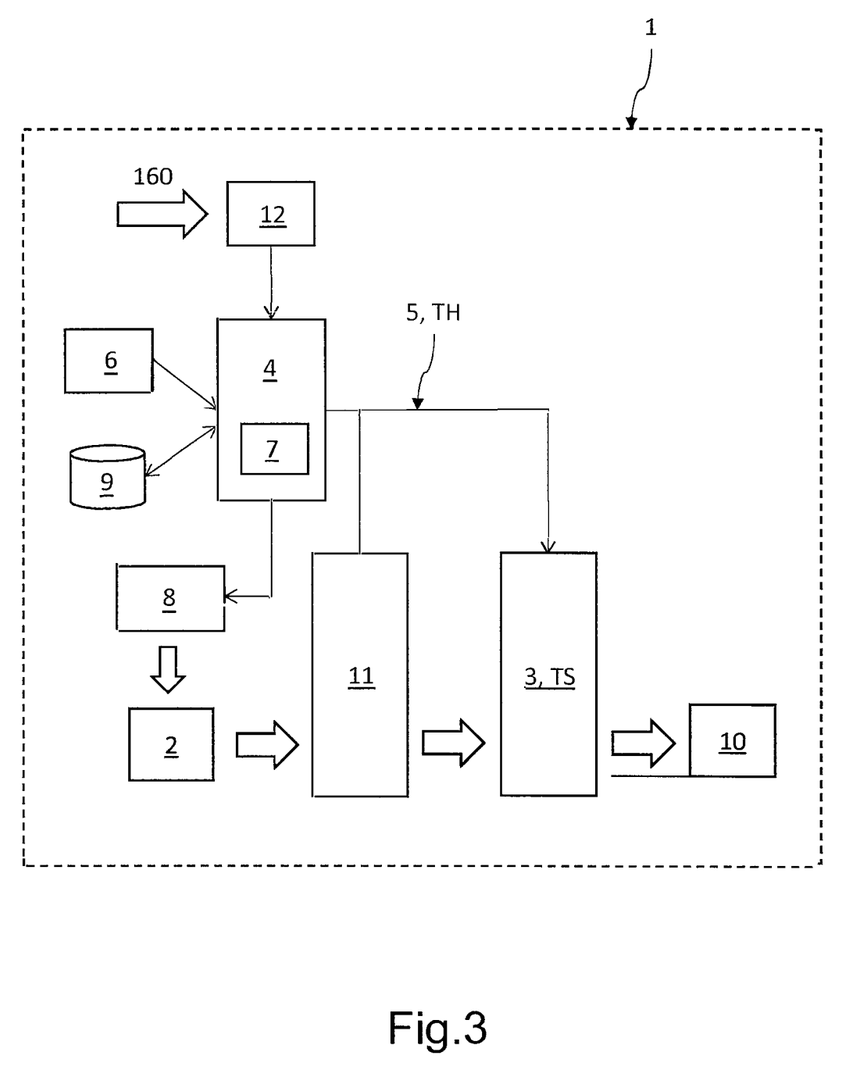
FIG. 3 is a schematic diagram of one embodiment of the system according to the invention.

FIG. 3 is a schematic diagram showing an embodiment of a system 1 according to the invention for providing a dental prosthesis 10 for a patient which is made from a ceramic material 2 having a colour matched to the colour of the patient's natural teeth by means of a sintering furnace 3 for sintering the ceramic material 2 and a control unit 4, which is connected to the sintering furnace 3 via a data line for controlling the sintering furnace 3 and is designed to receive a desired nominal colour for the dental prosthesis 10, which colour has previously been determined by a colour recognition device 12. The colour recognition device 12 recognises the tooth colour of the patient's existing natural or other teeth, wherein the colour recognition device 12 is connected by a data line to the control unit 4 for transmitting the determined nominal colour. The control unit 4 thereupon determines a deviation between nominal colour and actual colour, for which purpose it can access a database 9 containing material and process data for determining the deviation between nominal colour and actual colour, and defines a temperature-time cycle having a cycle time TH, suitable for offsetting the deviation, for the sintering at a defined sintering temperature TS and creates a corresponding sintering program 5 having a cycle time TH individually defined for the ceramic material 2 to be sintered. The system 1 here additionally comprises an output unit 8 with which the ceramic material selected by the control unit 4 can be output. The system 1 here additionally comprises a user interface 6 with the control unit 4, via which user-defined wishes regarding the dental prosthesis 10 can be input, wherein the control unit 4 is designed to take account of the user-defined wishes during creation of the sintering program 5. The system here additionally comprises a memory unit 7 for saving created sintering programs 5 which the control unit 4 can access for subsequently executing the sintering programs 5. In addition thereto, the system 1 here comprises a machining unit 11, for example a grinding and milling machine, for shaping the dental prosthesis 10 made from the ceramic material 2 before sintering is performed. The sintering furnace 3 receives transmitted from the control unit 4 for execution a corresponding sintering program 5 comprising the defined cycle time TH at the defined sintering temperature TS and, by the correspondingly applied temperature profile during sintering, adjusts the actual colour of the selected ceramic material 2 to the nominal colour 4.

The embodiments disclosed here are merely examples of the present invention and should therefore not be understood restrictively. Alternative embodiments considered by a person skilled in the art are equally well included in the scope of protection of the present invention.

LIST OF REFERENCE NUMERALS

1 System according to the invention for producing dental prosthesis
2 Ceramic material
3 Sintering furnace
4 Control unit
5 Sintering program
6 User interface with the control unit
7 Memory unit for saving sintering programs
8 Output unit for outputting the selected ceramic material
9 Database containing material parameters
10 Dental prosthesis
11 Machining unit
12 Colour recognition device
100 Method according to the invention for producing dental prosthesis from a ceramic material
110 Receiving a desired nominal colour for the dental prosthesis
120 Determining a deviation between nominal colour and actual colour
130 Defining a temperature time cycle having a cycle time, suitable for compensation of the deviation, for sintering at a defined sintering temperature and creating a corresponding sintering program
140 Adjusting the actual colour of the selected ceramic material to the nominal colour in the sintering furnace by the sintering program executed by the sintering furnace
150 Selecting the ceramic material, the actual colour of which approximates most closely to the nominal colour
160 Determining the nominal colour by means of a colour recognition device
170 Transmitting the determined nominal colour to the control unit
180 Reading in or inputting user-defined wishes via a user interface with the control unit
190 Saving created sintering programs in a memory unit
E Colour
E(120) Colour after 120 s cycle time
L Lightness value
TH Cycle time for adjusting the actual colour to the nominal colour
TM Minimum cycle time for establishing the mechanical properties
TP Translucency parameter
TS defined (e.g. constant) sintering temperature

The invention claimed is:

1. A method for providing a dental prosthesis for a patient which is made from a ceramic material having a colour matched to a patient situation, wherein a sintering furnace for sintering the ceramic material and a control unit ELIA] for controlling the sintering furnace are used for carrying out the following steps:
receiving a desired nominal colour for the dental prosthesis by the control unit;
determining a deviation between the nominal colour and actual colour of the sintered ceramic material by the control unit;
defining a temperature-time cycle, suitable for compensation of the deviation, for sintering at a defined sintering temperature and creating a corresponding sintering program having a cycle time individually defined for the ceramic material to be sintered by the control unit; and
adjusting the actual colour of the ceramic material to the nominal colour in the sintering furnace by the sintering program created by the control unit and executed by the sintering furnace.

2. The method according to claim 1, wherein it is ensured when defining the cycle time that the defined cycle time for adjusting the actual colour to the nominal colour exceeds a minimum cycle time for achieving desired mechanical properties of the ceramic material.

3. The method according to claim 2, defining the cycle time, the cycle time is defined as being longer in comparison with the minimum cycle time, the lower the lightness of the sintered ceramic material and/or the greater the change in opacity of the sintered ceramic material which is to be established.

4. The method according to claim 1, wherein the cycle time is defined between 100 s and 1200 s.

5. The method according to claim 1, further comprising the step of selection by the control unit of a ceramic material, the actual colour of which approximates as closely as possible to the nominal colour, as the ceramic material to be sintered and output of the selected ceramic material by means of an output unit.

6. The method according to claim 5, wherein, for selection of the ceramic material, the control unit accesses material data and/or process data stored in a database.

7. The method according to claim 1, further comprising the steps of:
- determining the nominal colour by means of a colour recognition device which is suitable for recognising a tooth colour of the patient's existing natural or other teeth: and
- transmitting the determined nominal colour to the control unit.

8. The method according to claim 1, further comprising the step of reading in or inputting user-defined wishes regarding the dental prosthesis, via a user interface with the control unit, wherein the control unit is designed to take account of the user-defined wishes during creation of the sintering program.

9. The method according to claim 1, further comprising the step of saving created sintering programs in a memory unit which the control unit can access, for subsequently executing the sintering programs after checking access authorisation.

10. The method according to claim 1, wherein, in addition to the respective sintering temperatures for the respective ceramic materials, the respective heating and cooling rates for the created sintering programs are held constant.

11. A system for providing a dental prosthesis for a patient which is made from a ceramic material having a colour matched to a patient situation by means of a sintering furnace for sintering the ceramic material and a control unit which is connected to the sintering furnace via a data line for controlling the sintering furnace and is designed to:
- receive a desired nominal colour for the dental prosthesis,
- determine a deviation between the nominal colour and the actual colour,
- define a temperature-time cycle having a cycle time, suitable for compensation of the deviation, for sintering at a defined sintering temperature and
- create a corresponding sintering program having a cycle time individually defined for the ceramic material to be sintered, wherein the sintering furnace is provided to execute a corresponding sintering program called up by the control unit which comprises the defined cycle time at the defined sintering temperature and so adjust the actual colour of the selected ceramic material to the nominal colour.

12. The system according to claim 11, further comprising a colour recognition device for determining the nominal colour which is suitable for recognising a tooth colour of the patient's existing natural or other teeth, wherein the colour recognition device is connected by a data line to the control unit for transmitting the determined nominal colour.

13. The system according to claim 11, further comprising a database containing material data and/or process data which can be accessed by the control unit for determining the deviation between nominal colour and actual colour.

14. The system according to claim 11, farther comprising an output unit which can output the ceramic material selected by the control unit and/or a user interface with the control unit via, which user-defined wishes regarding the dental prosthesis can be read in or input, wherein the control unit is designed to take account of the user-defined wishes during creation of the sintering program, and/or a memory unit for saving created sintering programs which the control unit can access, for subsequently executing the sintering programs, after checking access authorisation.

15. The system according to claim 11, further comprising a machining unit for shaping the dental prosthesis made from the ceramic material before sintering is performed.

* * * * *